US009199678B2

(12) United States Patent
Tsubaki et al.

(10) Patent No.: US 9,199,678 B2
(45) Date of Patent: Dec. 1, 2015

(54) CRAWLER BELT AND MASTER LINK FOR CRAWLER BELT

(75) Inventors: Tomoyuki Tsubaki, West Java (ID); Daijirou Itou, Hirakata (JP); Kenichi Hisamatsu, Hirakata (JP); Shigeto Marumoto, Hirakata (JP)

(73) Assignee: KOMATSU LTD, Tokyo (JP)

( * ) Notice: Subject to any disclaimer, the term of this patent is extended or adjusted under 35 U.S.C. 154(b) by 855 days.

(21) Appl. No.: 13/392,370

(22) PCT Filed: Apr. 22, 2011

(86) PCT No.: PCT/JP2011/059900
§ 371 (c)(1),
(2), (4) Date: Feb. 24, 2012

(87) PCT Pub. No.: WO2011/136135
PCT Pub. Date: Nov. 3, 2011

(65) Prior Publication Data
US 2012/0153715 A1 Jun. 21, 2012

(30) Foreign Application Priority Data
Apr. 28, 2010 (JP) .................................. 2010-102921

(51) Int. Cl.
*B62D 55/205* (2006.01)
*B62D 55/21* (2006.01)
*B62D 55/092* (2006.01)

(52) U.S. Cl.
CPC .............. *B62D 55/21* (2013.01); *B62D 55/092* (2013.01); *B62D 55/213* (2013.01)

(58) Field of Classification Search
CPC .............................. B62D 55/20; B62D 55/205
USPC ......... 305/185, 186, 187, 188, 190, 196, 198, 305/200, 201
See application file for complete search history.

(56) References Cited

U.S. PATENT DOCUMENTS

| 3,717,389 A | 2/1973 | Boggs et al. |
| 6,783,196 B2 * | 8/2004 | Maguire et al. ............... 305/186 |

(Continued)

FOREIGN PATENT DOCUMENTS

| CN | 201140736 Y | 10/2008 |
| JP | 47-0303235 U | 4/1971 |

(Continued)

OTHER PUBLICATIONS

Korean Office Action dated Jul. 24, 2013 (and a summary thereof in English) issued in counterpart Korean Application No. 10-2012-7006082.

(Continued)

*Primary Examiner* — S. Joseph Morano
*Assistant Examiner* — Jean Charleston
(74) *Attorney, Agent, or Firm* — Holtz, Holtz, Goodman & Chick PC

(57) ABSTRACT

A crawler belt and a master link for use in the crawler belt enable easy connection and disconnection of the crawler belt. The crawler belt has a track chain in which a plurality of regular links are pivotally connected at their ends, the master link for connecting the ends of the track chain to form the crawler belt into a loop, and track shoes attached to the regular links and the master link respectively. The crawler belt has a slit aperture which leads only to a pin insertion hole formed at the other end of the master link and is configured such that a clamping force, generated by tightening a master bolt that imparts a tightening force to the master link to narrow the slit aperture, is allowed to work on only the regular pin inserted into a pin insertion hole leading to the slit aperture.

3 Claims, 6 Drawing Sheets

(56) References Cited

U.S. PATENT DOCUMENTS

| | | | |
|---|---|---|---|
| 6,866,351 | B2 | 3/2005 | Yamamoto |
| 7,614,709 | B2 * | 11/2009 | Oertley ................. 305/186 |
| 8,272,701 | B2 * | 9/2012 | Mulligan ................ 305/190 |
| 2003/0141760 | A1 * | 7/2003 | Yamamoto ............. 305/185 |
| 2004/0036353 | A1 | 2/2004 | Hasselbusch et al. |
| 2008/0174175 | A1 | 7/2008 | Livesay et al. |

FOREIGN PATENT DOCUMENTS

| | | |
|---|---|---|
| JP | 47-030335 U | 12/1972 |
| JP | 49-113341 U | 9/1974 |
| JP | 51-119232 U | 9/1976 |
| JP | 2003-220983 A | 8/2003 |
| JP | 2004-07505 A | 3/2004 |
| JP | 2004-075059 A | 3/2004 |
| JP | 2004-075063 A | 3/2004 |
| JP | 2008-018795 A | 1/2008 |
| WO | WO 2008/091499 A1 | 7/2008 |
| WO | WO 2008/113264 A1 | 9/2009 |

OTHER PUBLICATIONS

International Preliminary Report on Patentability (IPRP) and Written Opinion dated Dec. 10, 2012 (in English) issued in parent International Application No. PCT/JP2011/059900.

International Search Report dated Jul. 19, 2011 issued in International Appln. No. PCT/JP2011/059900.

Chinese Office Action dated Jul. 1, 2013 (and English translation thereof) in counterpart Chinese Application No. 201180003508.1.

Partial English translation of a Korean Office Action issued in Korean Application No. 2012-7006082.

* cited by examiner

CRAWLER BELT AND MASTER LINK FOR CRAWLER BELT

This application is a U.S. National Phase Application under 35 USC 371 of International Application PCT/JP2011/059900 filed Apr. 22, 2011.

TECHNICAL FIELD

The invention relates to a crawler belt for use in a work vehicle such as hydraulic excavators and bulldozers and to a master link that is used for forming a crawler belt into an endless loop.

BACKGROUND ART

Generally, a crawler belt provided for a work vehicle of this type encircles an idler tumbler (idler) and a driving wheel (sprocket), forming an elliptical shape to provide an endless track between these idler tumbler and driving wheel. The driving wheel is rotatively driven to cause the crawler belt to rotate about a path between the idler tumbler and the driving wheel so that the work vehicle is stably propelled over the irregular terrain or the like.

The crawler belt is composed of a track chain in which a plurality of regular links are rotatably connected to each other at their ends; track shoes attached to the regular links respectively; and a coupling device for connecting the opposed ends of the track chain to form the crawler belt into a loop.

In the track chain of this crawler belt, the ends of every adjacent regular links are made to overlap each other and connected in belt-like form with the aid of coupling pins called "regular pins". The allowance for clamping the regular pins relative to the regular links is set to a relatively small value so that the regular pins cannot be easily removed from and inserted into their associated regular links.

At the position where the leading and trailing ends of the belt-like track chain of the crawler belt are connected together or the track chain of the crawler belt, which has been connected into a loop, is disconnected, a master link for connection/disconnection, a master pin or both of them are disposed as the coupling device. In one known connection configuration which employs both a master link and a master pin, the master link and a regular link are coupled by a coupling pin called "master pin", forming an endless crawler belt. In this configuration, the allowance for clamping the master pin relative to the master link is set to a relatively great value, and therefore, the master pin can be removed or inserted by use of a press machine.

For performing maintenance on the crawler belt, removal of the crawler belt from the idler tumbler and the driving wheel and/or mounting of the crawler belt so as to encircle the idler tumbler and the driving wheel is sometimes performed.

In this case, the removal of the crawler belt is performed in the following way. Specifically, the master link and the regular link are disconnected from each other by taking the master pin out. Then, the crawler belt wound around the idler tumbler and the driving wheel is linearly stretched.

On the other hand, the mounting of the crawler belt is performed as follows. Specifically, the linearly-stretched crawler belt is wound around the idler tumbler and the driving wheel. Then, the master pin is inserted into the master link and the regular link thereby to connect them.

By inserting and removing the master pin in this way, the crawler belt can be mounted and dismounted.

However, the removal and insertion of the master pin requires a press machine and involves a lot of trouble, which causes difficulties in mounting and dismounting of the crawler belt.

One known technique for solving the above problem does not use a master pin but uses a splittable master link. More specifically, this master link is constituted by two half links and set up by fastening these two half links to each other with a track shoe mounting bolt.

The two-splittable link described herein includes a convex part and a concave part which are brought into engagement with each other upon set-up. One of the two half links is connected to the other end of a regular link adjacent to one end of the master link whereas the other half link is connected to one end of a regular link adjacent to the other end of the master link.

The convex part and the concave part of the two half links are thus engaged and the two half links are fastened by the track shoe mounting bolt whereby the crawler belt can be connected in endless form. Reversely, the crawler belt can be disconnected by loosening and removing the track shoe mounting bolt and disengaging the convex part and concave part of the two half links from each other.

The method utilizing a splittable master link can more easily accomplish mounting and dismounting of the crawler belt, compared to the method that uses a master pin and the method that uses both a master pin and a master link.

However, the convex part and the concave part have to be tightly engaged with each other in order to firmly combine the two half links, which constitute the master link, by tightening the track shoe mounting bolt. This raises the need for special equipment capable of machining the convex and concave parts with high accuracy in the manufacture of the two half links. As a result, there arises the problem that the production cost of the master link increases.

In addition, since the master link is configured to be set up by tightly fastening the two half links with the track shoe mounting bolt, there is a risk that the track shoe mounting bolt fractures, for example, when an impactive load is imposed on the master link.

As one attempt for solving the above problem, the master link disclosed in Patent Literature 1 has been proposed.

PRIOR ART DOCUMENT

Patent Literature

Patent Literature 1: JP-A-2004-75059

The master link disclosed in Patent Literature 1 has a first insertion hole located at one end thereof, a second insertion hole located at the other end thereof, and a slit aperture that connects the first insertion hole and the second insertion hole together.

In this master link, a first bolt is threaded into a position in the vicinity of the first insertion hole and a second bolt is threaded into a position in the vicinity of the second insertion hole. Both of the first and second bolts also serve as a fastening device for attaching the track shoe to the master link.

By screwing the first and second bolts, the slit aperture is narrowed and, therefore, the respective diameters of the first and second insertion holes are reduced. This enables it to impart a clamping force to a first coupling pin inserted in the first insertion hole and to a second coupling pin inserted in the second insertion hole respectively, so that the connection of the crawler belt by the master link can be maintained.

Conversely, if the first and second bolts are loosened, the slit aperture is expanded in a direction in which the slit aperture is restored to an original size, so that the diameters of the first and second insertion holes are increased. This makes it possible to easily remove the first and second coupling pins so that the loop-shaped crawler belt in its connection state can be disconnected and brought into a straight belt state.

To apply sufficient clamping force to the first or second coupling pin, the width of the slit aperture has to be uniformly reduced throughout its length by tightening the bolts. In the crawler belt disclosed in Patent Literature 1, the tightening point is more resemble to a spot compared to the length of the slit aperture of the master link and therefore the width of the slit aperture is reduced unevenly with respect to its lengthwise direction. As a result, there arises the possibility that the clamping force working on the coupling pins is insufficient.

When applying a clamping force to the first and second coupling pins respectively, the first and second bolts are alternately screwed into the master link. If the first and second blots differ in their screwing amounts, the bolt having smaller screwing amount becomes loosened. This means that the tightening of the first bolt and the tightening of the second bolt interfere with each other. It is therefore difficult to narrow the slit aperture by screwing the first and second bolts into the master link so as not to cause a difference between the screwing amounts of the first and second bolts in order that a proper clamping force is applied to the first and second coupling pins respectively.

The crawler belt using the master link disclosed in Patent Literature 1 suffers from the following problem. That is, although the operation for disconnecting the crawler belt can be easily performed through removal of the first and second bolts, it is difficult to apply a proper clamping force to the first and second coupling pins respectively by controlling the tightening of the first and second bolts and therefore, the operation for connecting the crawler belt cannot be easily performed.

SUMMARY OF INVENTION

Problems to be Solved by the Invention

The invention has been made with the intent of overcoming the foregoing problems and it is therefore a primary object of the invention to provide a crawler belt and a master link for use with the crawler belt, which are capable of easily performing both crawler belt connection and crawler belt disconnection.

Solution to Problem

In accomplishing the above object, there has been provided, in accordance with a first aspect of the invention, a crawler belt having a track chain in which a plurality of regular links are pivotally connected at their ends, a master link for connecting ends of the track chain together to form the crawler belt into a loop, and track shoes respectively attached to the regular links and the master link;

wherein the regular links having one end and the other end are configured such that the other end is offset relative to the one end in a direction apart from a center line of the track chain;

wherein the master link having one end and the other end is configured such that the other end is offset relative to the one end in a direction apart from the center line of the track chain and has a first insertion hole located at the one end, a second insertion hole located at the other end and a central through hole located at a center between the one end and the other end;

the crawler belt further comprising:

a first coupling pin which is inserted into the first insertion hole and an insertion hole formed at the other end of one of the plurality of regular links, the aforesaid one regular link being adjacent to the one end of the master link;

a second coupling pin which is inserted into the second insertion hole and an insertion hole formed at the one end of one of the plurality of regular links, the aforesaid one regular link being adjacent to the other end of the master link;

a slit aperture formed in the master link, one end of the slit aperture leading to the central through hole whereas the other end leads to the second insertion hole;

a spacer inserted into the slit aperture to adjust its width to a specified value;

a first bolt screwed into a first screw hole which is formed in the master link at a position intermediate between the first insertion hole and the central through hole; and a second bolt screwed into a second screw hole which is formed in the master link at a position intermediate between the central through hole and the second insertion hole so as to pass transversely across the slit aperture.

The crawler belt according to the first aspect is preferably modified such that the first and second bolts are screwed into the first and second screw holes respectively, through bolt insertion holes provided in an associated one of the track shoes (second aspect of the invention).

According to a third aspect of the invention, there is provided a master link for connecting ends of a track chain together to form a crawler belt into a loop;

the master link being an integral plate having a track shoe mounting surface to which a track shoe is mounted, a tread opposed to and parallel to the track shoe mounting surface, a first surface connecting the track shoe mounting surface and a longitudinal side of the tread together, and a second surface opposed to the first surface, the master link further comprising:

a first insertion hole which is located at one end thereof, passing through from the first surface to the second surface;

a second insertion hole which is located at the other end thereof, passing through from the first surface to the second surface;

a central through hole which is located at a position intermediate between the one end and the other end, passing through from the first surface to the second surface;

a slit aperture formed in parallel with the track shoe mounting surface, with its one end leading to the central through hole whereas the other end leads to the second insertion hole;

a spacer inserted into the slit aperture to adjust its width to a specified value;

a first screw hole which is located at a position intermediate between the first insertion hole and the central through hole, being opened to the track shoe mounting surface and extending in a direction toward the tread; and a second screw hole which is located at a position intermediate between the second insertion hole and the central through hole so as to pass transversely across the slit aperture, being opened to the track shoe mounting surface and extending in a direction toward the tread.

According to a fourth aspect of the invention, there is provided a crawler belt having a track chain in which a plurality of regular links are pivotally connected at their ends, track shoes respectively attached to the regular links, and a master link for connecting ends of the track chain together to form the crawler belt into a loop, wherein the master link is composed of a first master link and a second master link;

the crawler belt further comprising:

a first coupling pin which is inserted into an insertion hole located at the other end of one of the plurality of regular links, the aforesaid one regular link being adjacent to one end of the first master link and which is inserted into an insertion hole located at one end of the master link, a second coupling pin which is inserted into an insertion hole located at the other end of the first master link and which is inserted into an insertion hole located at one end of the second master link;

a third coupling pin which is inserted into an insertion hole located at one end of one of the plurality of regular links, the aforesaid one regular link being adjacent to the other end of the second master link and which is inserted into an insertion hole located at the other end of the second master link;

a first slit aperture formed in the first master link so as to lead only to the insertion hole located at the other end of the first master link;

a second slit aperture formed in the second master link so as to lead only to the insertion hole located at the one end of the second master link;

a first fastening device for allowing a tightening force for narrowing the first slit aperture to work on the first master link; and a second fastening device for allowing a tightening force for narrowing the second slit aperture to work on the second master link.

The crawler belt according to the fourth aspect of the invention is preferably modified such that a first spacer is inserted into the first slit aperture to adjust its width to a specified value when the first fastening device is tightened and such that a second spacer is inserted into the second slit aperture to adjust its width to a specified value when the second fastening device is tightened (fifth aspect of the invention).

The crawler belt according to the fourth or fifth aspect of the invention is preferably modified such that the second coupling pin has (i) a core pin constituting a core part of the second coupling pin; (ii) a sleeve which includes a pin press fit hole for receiving the core pin forcibly inserted therein and which is inserted into the insertion hole located at the other end of the first master link; (iii) a bushing which includes a hollow portion into which the core pin is slidably and fittingly inserted and which is inserted into the insertion hole located at the one end of the second master link; and (iv) a seal interposed between the sleeve and the bushing (sixth aspect of the invention).

The crawler belt according to any one of the fourth to sixth aspects of the invention is preferably modified such that the first fastening device is screwed into a screw hole provided in the first master link through a bolt insertion hole provided in an associated one of the track shoes and the second fastening device is screwed into a screw hole provided in the second master link through a bolt insertion hole provided in the track shoe (seventh aspect of the invention).

Advantageous Effects of the Invention

In the crawler belt according to the first aspect of the invention, the master link is provided with the slit aperture which leads to the central through hole and to the second insertion hole, and the second bolt is screwed into the second screw hole so as to pass transversely across this slit aperture. Therefore, the clamping force generated by tightening the second bolt works on only the second coupling pin inserted into the second insertion hole that leads to the slit aperture. Since a proper clamping force can be applied to the second coupling pin inserted into the second insertion hole that leads to the slit aperture by controlling the tightening force for the second bolt, connection of the crawler belt can be easily performed.

In addition, since the second coupling pin can be easily extracted from the second insertion hole that leads to the slit aperture by releasing the tightening force for the second bolt, disconnection of the crawler belt can be easily performed.

Accordingly, the crawler belt according to the first aspect of the invention accomplishes easy connection and disconnection of the crawler belt through the operation of the second bolt that serves as a fastening device. In addition, the amount of tightening the fastening device can be adjusted by the spacer, and therefore a proper clamping force can be more readily and accurately applied to the coupling pin.

The configuration according to the second aspect of the invention eliminates the need for a special fastening device for narrowing the slit aperture, which leads to simplification of the system configuration.

The master link according to the third aspect of the invention enables it to easily perform connection and disconnection of the crawler belt.

In the crawler belt according to the fourth aspect of the invention, the first master link is provided with the first slit aperture that leads to only the insertion hole located at the other end of the first master link, and the second master link is provided with the second slit aperture that leads to only the insertion hole located at the one end of the second master link. Therefore, the clamping force generated by tightening the first fastening device and the clamping force generated by tightening the second fastening device work on the second coupling pin alone.

Since a proper clamping force can be applied to the second coupling pin by respectively controlling the tightening forces for the first and second fastening devices, connection of the crawler belt can be readily performed. In addition, since the second coupling pin can be easily removed by releasing the respective tightening forces for the first and second fastening devices, easy disconnection of the crawler belt is enabled.

The crawler belt according to the fourth aspect of the invention thus accomplishes easy connection and disconnection of the crawler belt through the respective operations of the first fastening device and the second fastening device.

In the configuration according to the fifth aspect of the invention, the tightening amount for the first fastening device and the tightening amount for the second fastening device are adjusted by the first and second spacers respectively and therefore a proper clamping force can be more readily and accurately applied to the second coupling pin.

In the configuration according to the sixth aspect of the invention, the second coupling pin serves as a so-called cartridge pin that has the functions of a coupling pin, a bearing and a sealing device.

The second coupling pin serving as a cartridge pin enables it to prevent leakage of the lubricant with a seal which lubricant has been supplied to a space between the core pin and the bushing, so that the core pin and the busing can be kept in a stable sliding contact condition over a long period of time. In addition, since the insertion and removal of the second coupling pin that serves as a cartridge pin is equivalent to the collective insertion and removal of a coupling pin, a bearing and a sealing device, the operational efficiency of the connection and disconnection of the crawler belt can be increased.

This makes it possible not only to provide a crawler belt which can be kept in a stable connection condition over a prolonged period even if it is used under severe traveling conditions and but also to increase the operational efficiency of the connection and disconnection of the crawler belt.

The configuration according to the seventh aspect of the invention eliminates the need for a fastening device for narrowing the first slit aperture and a fastening device for narrowing the second slit aperture, which leads to simplification of the system configuration.

BEST MODE FOR CARRYING OUT INVENTION

Referring now to the accompanying drawings, a crawler belt and a master link for the crawler belt will be described according to preferred embodiments of the invention.

First Embodiment

Figure 1:
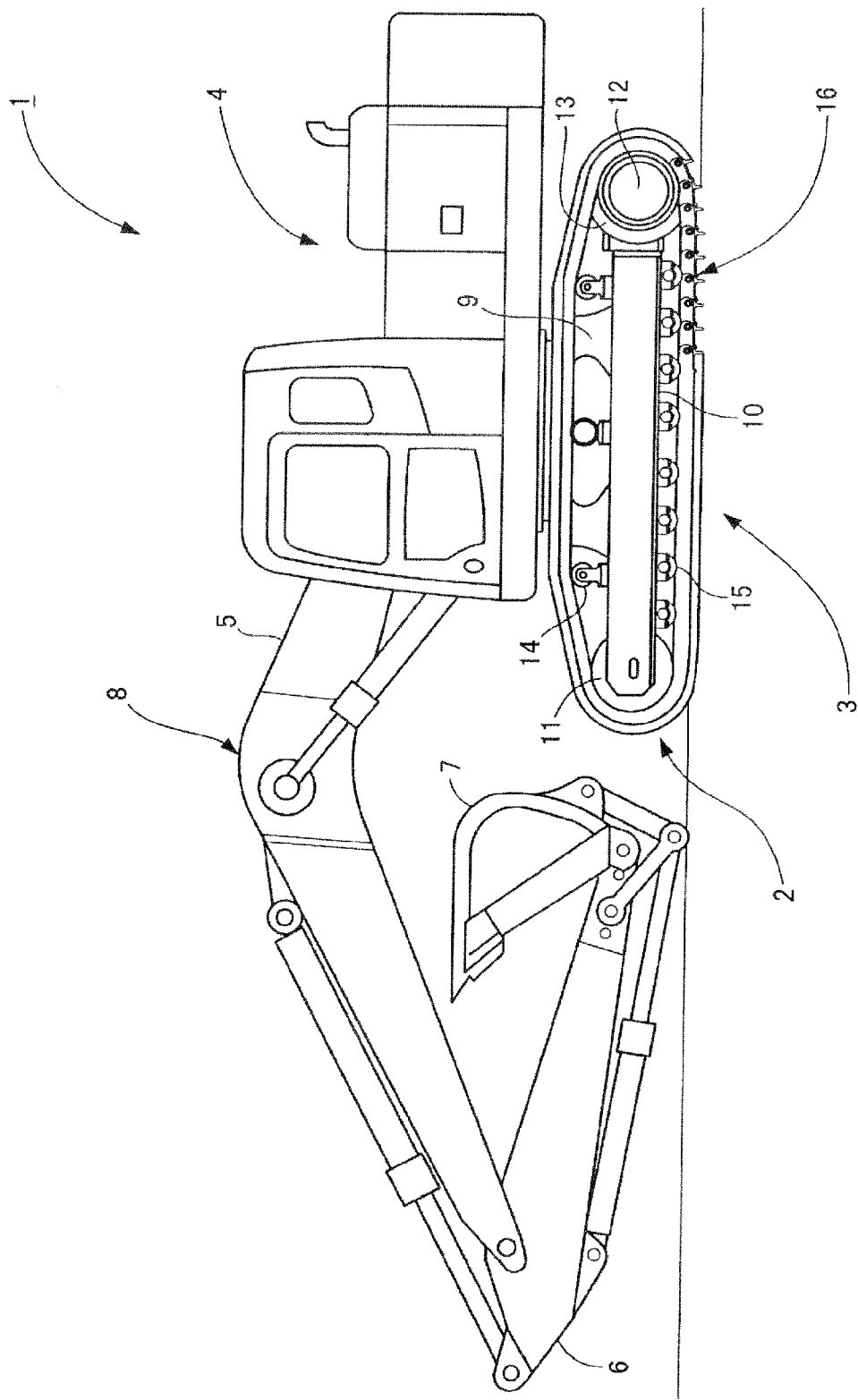
FIG. 1 is a side view of a hydraulic excavator equipped with a crawler belt according to a first embodiment of the invention.

FIG. 1 shows a side view of a hydraulic excavator equipped with a crawler belt according to a first embodiment of the invention.

(Outline of Hydraulic Excavator)

FIG. 1 shows a hydraulic excavator 1 that is equipped with lower machinery 3 having a crawler track unit 2 and a revolving superstructure 4 mounted on the lower machinery 3 so as to be freely revolvable.

Mounted to the center of the front part of the revolving superstructure 4 is a work implement 8 to which a boom 5, an arm 6 and a bucket 7 are connected such that they are freely pivotable relative to each other. Operations such as digging are performed through bending and hoisting of the work implement 8.

(Outline of Crawler Track Unit of Hydraulic Excavator)

The crawler track unit 2 has crawler frames 10 (only the left crawler frame is shown) which are located on the opposed sides, respectively, of a center frame 9 of the lower machinery 3, extending in a longitudinal direction.

In each of the crawler frames 10, an idler (idler tumbler) 11 is rotatably disposed at its front end whereas a sprocket (driving wheel) 13, which is rotatively driven by a travel hydraulic motor 12, is disposed at its rear end. Desired track carrier rollers 14 and track rollers 15 are provided on the upper surface and lower surface, respectively, of the crawler frame 10.

A crawler belt 16 encircles the idler 11 and the sprocket 13, forming an elliptical shape such that it is guided by the track carrier rollers 14 and the track rollers 15. The sprocket 13 is rotatively driven by the travel hydraulic motor 12 to allow the go-around movement of the crawler belt 16 between the idler 11 and the sprocket 13 so that the hydraulic excavator 1 is stably propelled over the irregular terrain.

(Outline of Crawler Belt)

Figure 2:
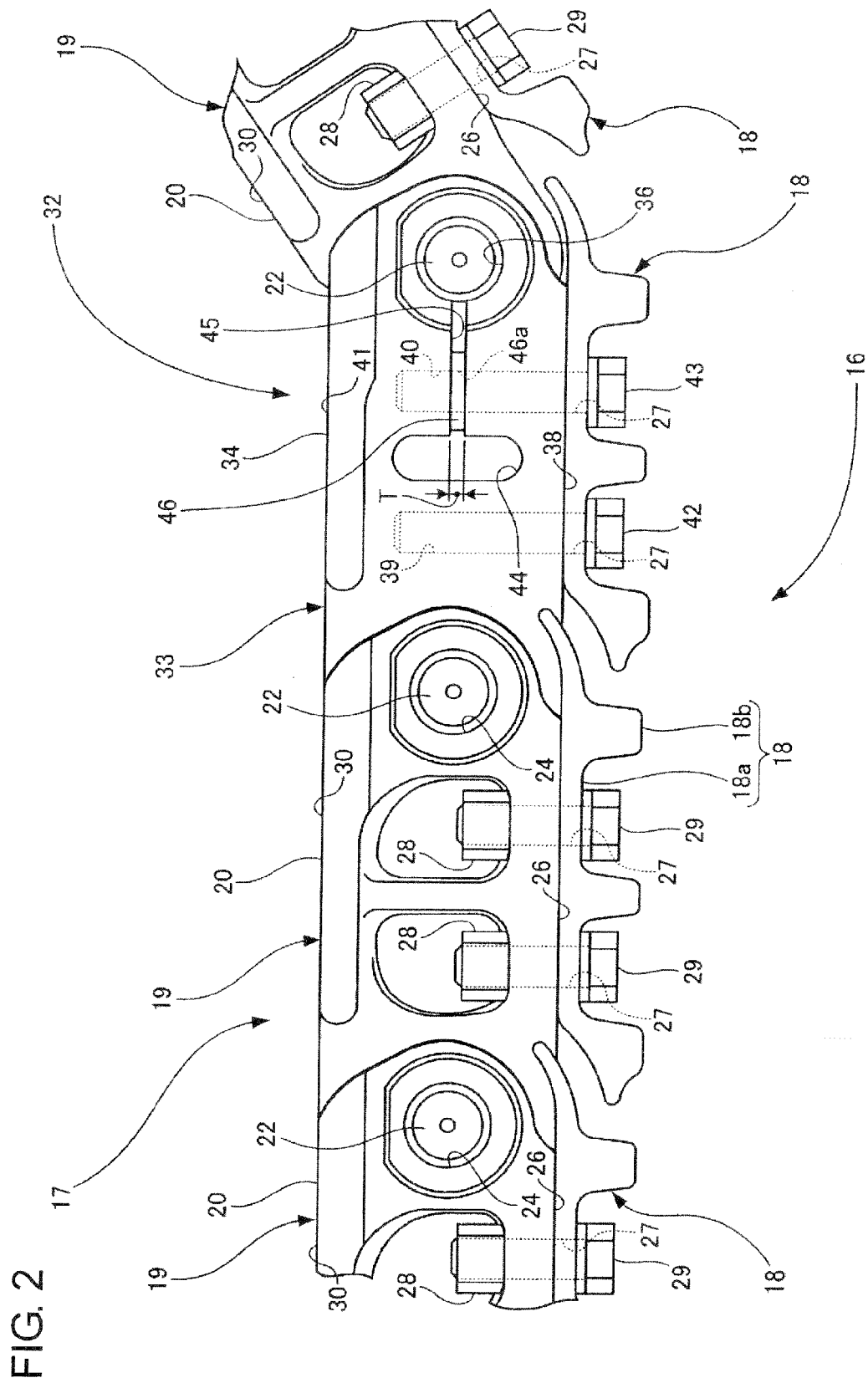
FIG. 2 is a side view of the crawler belt according to the first embodiment.
Figure 3:
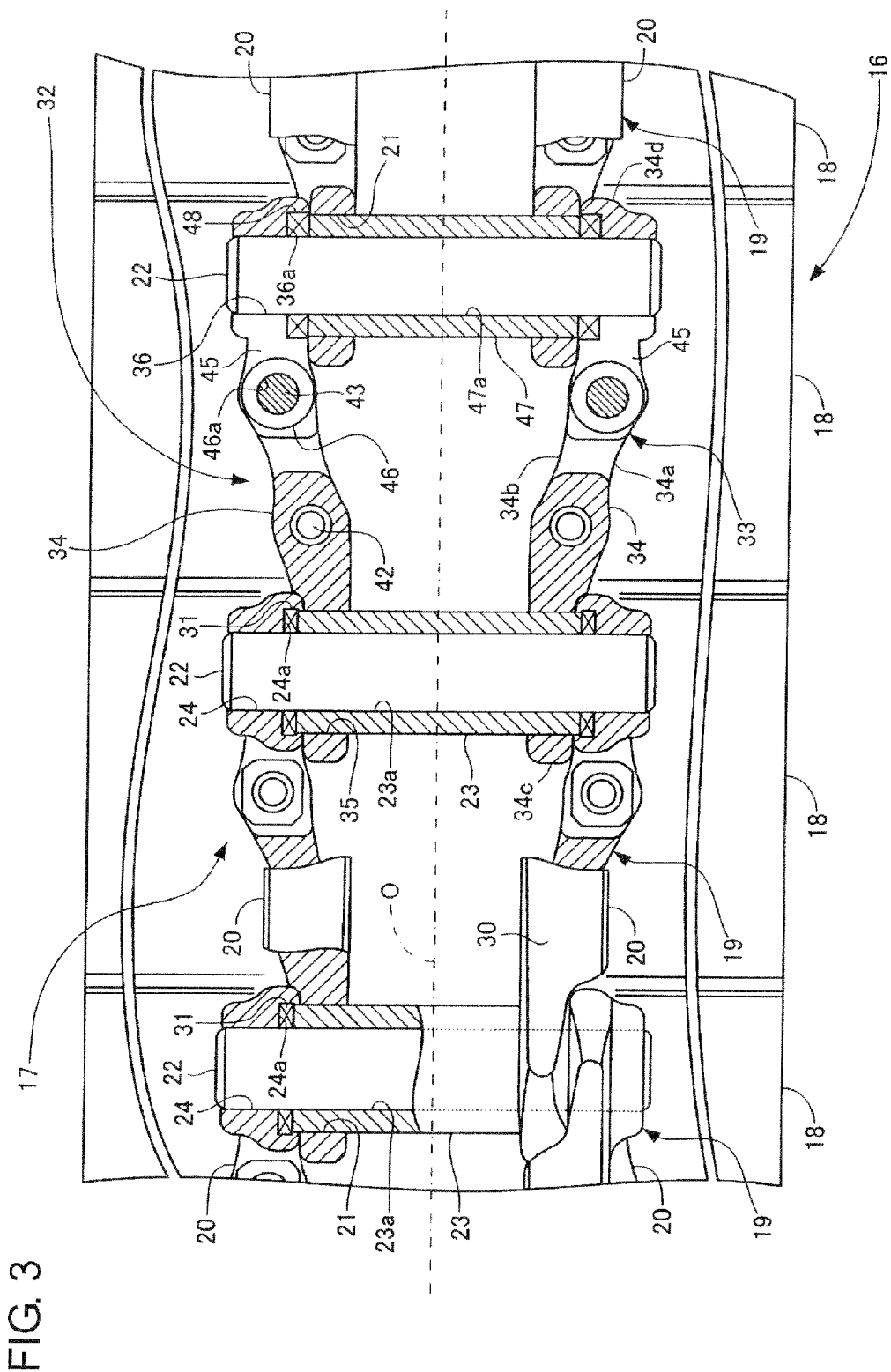
FIG. 3 is a plan view of the crawler belt according to the first embodiment.

As shown in FIGS. 1, 2 and 3, the crawler belt 16 is formed into an endless loop by connecting the longitudinal ends of a belt composed of a track chain 17 and track shoes 18 by use of a coupling device 32.

The track chain 17 is composed of a plurality of regular link assemblies 19 which are rotatably connected together at their ends.

Each track shoe 18 is constituted by a flat plate portion 18a and a protrusion portion 18b. The plate portion 18a is configured to come into contact with the ground surface, receiving the weight of the vehicle body. The protrusion portion 18b is called "grouser" and not only prevents slippage by digging into the earth but also serves as a reinforcement member.

(Description of Regular Link Assembly)

Each regular link assembly 19 is constituted by a pair of regular links 20 which are opposed to each other with the center line O of the track chain 17 interposed therebetween.

(Outline of Regular Link)

The regular links 20 are offset links having one end and the other end in which the other end is offset relative to the one end in a direction apart from the center line O of the track chain 17. As the opposed pair of regular links 20 are formed as mirror images of each other, one of them will be described in the following description.

(Description of Insertion Holes of Regular Link)

The regular link 20 has a bushing insertion hole 21 formed at one end thereof. Inserted into the bushing insertion hole 21 is a regular bushing 23 which has a regular pin 22 and a hollow portion 23a into which the regular pin 22 is slidably and fittingly inserted.

At the other end of the regular link 20, a pin insertion hole 24 is formed into which the regular pin 22 is inserted. Formed on the periphery of the pin insertion hole 24 is a stepped hole 24a that is opened toward the center line O of the track chain 17 and is concentric with the pin insertion hole 24.

(Description of Mounting Structure of Track Shoe Mounted on Regular Link)

The surface of the regular link 20 located on the side that comes into contact with the ground is a track shoe mounting surface 26. A track shoe 18 is secured to the track shoe mounting surface 26 by tightening two regular bolts 29 which are screwed into nuts 28 provided in the regular link 20 through bolt insertion holes 27 provided in the plate portion 18a. The track shoe 18 is attached to the regular link assembly 19 by four regular bolts 29 in total.

(Description of Tread of Regular Link)

The surface of the regular link 20 located on the side which does not come into contact with the ground is a tread 30 which comes into rolling contact with the idler 11, the track carrier rollers 14 and the track rollers 15 (see FIG. 1) respectively. Surface hardening treatment such as thermal treatment has been applied to the tread 30 to prevent the wear caused by the contact.

(Description of Clamping Allowance for Regular Pin and Regular Bushing Relative to Regular Link)

The clamping allowance for the regular pin 22 relative to the regular link 20 is set to a relatively small value so that the regular pin 22 cannot be easily inserted into and removed from the pin insertion hole 24.

The clamping allowance for the regular bushing 23 relative to the regular link 20 is also set to a relatively small value so that the regular bushing 23 cannot be easily inserted into and removed from the bushing insertion hole 21.

(Description of Regular Seal)

The stepped hole 24a of the regular link 20 is provided with a regular seal 31 incorporated therein, for sealing off the gap between the regular pin 22 and the regular bushing 23. In this way, the grease injected into the space between the regular pin 22 and the regular bushing 23 can be prevented from leaking to the outside environment. Herein, the regular bushing 23 has such length that its end slightly bites into the stepped hole 24a of the regular link 20. Therefore, the regular seal 31 is incorporated in such a way that it is thoroughly pushed into the stepped hole 24a by the regular bushing 23.

(Outline of Coupling Device of Crawler Belt)

The coupling device 32 of the crawler belt according to this embodiment includes a master link assembly 33 disposed at a position where connection or disconnection of the track chain 17 is performed. This master link assembly 33 is composed of a pair of master links 34 that are opposed to each other with the center line O of the track chain 17 interposed therebetween.

(Outline of Master Link)

Similarly to the regular links 20, each master link 34 is constituted by an integral plate which has substantially six surfaces. Referring to FIGS. 2 and 3, the six surfaces are a track shoe mounting surface 38 located on the lower side, a tread 41 located on the upper side, a first surface 34a located on the front side (the side confronting the viewer of FIG. 2), a second surface 34b located on the rear side (the side opposite to the confronting side of FIG. 2), a first end surface 34c located at one end (the left side) with respect to a longitudinal direction, and a second end surface 34d located at the other end (the right side) with respect to the longitudinal direction. The track shoe mounting surface 38 and the tread 41 are opposite and parallel to each other, whereas the front surface 34a and the rear surface 34b are opposite and parallel to each other. The front surface 34a and the rear surface 34b connect the longitudinal ends of the track shoe mounting surface 38 to the tread 41. The master links 34 are offset links having one end and the other end in which the other end is offset relative to the one end in a direction away from the center line O of the track chain 17. The opposed pair of master links 34 are formed as mirror images of each other and therefore one of them will be described in the following description.

(Description of Insertion Holes of Master Link)

At one end of the master link 34, a bushing insertion hole (first insertion hole) 35 is formed, which passes through the area between the front surface 34a and the rear surface 34b. Inserted into the bushing insertion hole 35 is the regular bushing 23 which has the regular pin 22 and the hollow portion 23a into which the regular pin 22 is slidably and fittingly inserted.

Formed at the other end of the master link 34 is a pin insertion hole (second insertion hole) 36 which passes through the area between the front surface 34a and the rear surface 34b and into which the regular pin 22 is inserted. Formed on the periphery of the pin insertion hole 36 is a stepped hole 36a that is opened toward the center line O of the track chain 17 and is concentric with the pin insertion hole 36.

(Description of Mounting Structure of Track Shoe Mounted to Master Link)

The surface of the master link 34 located on the ground contact side is the track shoe mounting surface 38.

A screw hole (first screw hole) 39 is provided in the vicinity of the bushing insertion hole 35 of the master link 34. A screw hole (second screw hole) 40 is provided in the vicinity of the pin insertion hole 36 of the master link 34. These screw holes 39, 40 are both opened to the track shoe mounting surface 38 and extend in a direction toward the tread 41 formed in the ground non-contact side of the master link 34.

The track shoe 18 is secured to the track shoe mounting surface 38 by tightening a master bolt (first bolt) 42 and a master bolt (second bolt) 43 which are screwed into the screw holes 39, 40 provided in the master link 34, passing through the bolt insertion holes 27 defined in the plate portion 18a. The track shoe 18 is attached to the master link assembly 33 by four master bolts in total, that is, two master bolts 42 and two master bolts 43.

(Outline of Tread of Master Link)

The tread 41 of the master link 34 is a surface that comes into rolling contact with the idler 11, the track carrier rollers 14 and the track rollers 15 (they are shown in FIG. 1) and has been subjected to surface hardening treatment such as thermal treatment in order to prevent the wear caused by the contact.

(Outline of Slit Aperture of Master Link)

Provided at the center of the master link 34 is a central through hole 44 located at a position intermediate between the screw holes 39 and 40. The central through hole 44 is a hole that passes through the master link 34 in a thickness-wise direction (hole that passes through the front surface 34a and the rear surface 34b) and takes the form of an elongated circle extending between the track shoe mounting surface 38 and the tread 41. The master link 34 has a slit aperture 45 that leads to the pin insertion hole 36 located at the other end, passing transversely across the screw hole 40 from the central through hole 44. The slit aperture 45 is a clearance that is located at a position substantially intermediate between the track shoe mounting surface 38 and tread 41 of the master link 34 and passes through between the front surface 34a and rear surface 34b of the master link 34, being parallel to the track shoe mounting surface 38 and the tread 41. The vertical dimension T of the slit aperture 45 is smaller than those of the central through hole 44 and the pin insertion hole 36.

(Description of Spacer Inserted in Slit Aperture)

A spacer (spacer portion) 46 is inserted in the slit aperture 45. This spacer 46 is constituted by an annular flat plate having a bolt insertion hole 46a through which a master bolt 43 can be inserted. The underside of the spacer 46 is securely adhered to the master link 34 with an adhesive such that the bolt insertion hole 46a is in alignment with the screw hole 40 of the master link 34. In other words, the screw hole 40 is provided so as to transversely pass across the slit aperture 45 and the spacer 46.

The thickness of the spacer 46 is so determined as to cause the width of the slit aperture 45 to have a specified value (T) when tightening the master bolt 42 screwed into the screw hole 39 of the master link 34 and the master bolt 43 screwed into the screw hole 40 through the bolt insertion hole 46a of the spacer 46. The central through hole 44 is positioned at one end of the slit aperture 45 and the pin insertion hole 36 is positioned at the other end of the same, and these holes are sufficiently greater in size than the width of the slit aperture 45 and therefore the width of the slit aperture 45 is substantially uniformly reduced when the tightening is done.

(Description of Structure of Connection Parts of Master Link and Regular Link Located at One End of Master Link)

The structure of the connection parts of the master link 34 and the regular link 20 adjacent to one end of the master link 34 will be described.

At the side near the center line O of the track chain 17, one end of the master link 34 overlaps the other end of the regular link 20.

The regular pin 22 is incorporated so as to pierce the hollow portion 23a of the regular bushing 23 inserted into the bushing insertion hole 35 of the master link 34 and into the pin insertion hole 24 of the regular link 20. As mentioned earlier, the clamping allowance for the regular pin 22 relative to the regular link 20 is set to a relatively small value so that the regular pin 22 cannot be easily inserted into and removed from the pin insertion hole 24. Similarly, the clamping allowance for the regular bushing 23 relative to the master link 34 is also set to a relatively small value so that the regular bushing 23 cannot be easily inserted into and removed from the bushing insertion hole 35.

The gap between the regular bushing 23 inserted into the bushing insertion hole 35 of the master link 34 and the regular pin 22 inserted into the pin insertion hole 24 of the regular link 20 is tightly sealed off by the regular seal 31 incorporated into the stepped hole 24a of the regular link 20 so that the grease injected between the regular pin 22 and the regular bushing 23 does not leak to the outside environment.

(Description of Structure of Connection Parts of Master Link and Regular Link Located at Other End of Master Link)

The structure of the connection parts of the master link 34 and the regular link 20 adjacent to the other end of the master link 34 will be described.

At the side near the center line O of the track chain 17, one end of the regular link 20 overlaps the other end of the master link 34.

A master bushing 47 is inserted into the bushing insertion hole 21 of the regular link 20. This master bushing 47 basically does not differ from the regular bushing 23 except the following point. Specifically, the regular bushing 23 has such length that its end protrudes from the bushing insertion hole 21, slightly biting into the stepped hole 24a of the regular link 20, whereas the master bushing 47 has such length that its end does not protrude from the bushing insertion hole 21 but its end face is flush with the periphery of the bushing insertion hole 21.

The regular pin 22 is incorporated so as to pierce a hollow portion 47a of the master bushing 47 inserted into the bushing insertion hole 21 of the regular link 20 and into the pin insertion hole 36 of the master link 34.

The gap between the master bushing 47 and the regular pin 22 is sealed off by a master seal 48 incorporated into the stepped hole 36a of the master link 34 so that the grease injected between the regular pin 22 and the master bushing 47 does not leak to the outside environment. This master seal 48 has basically the same structure as of the regular seal 31 except that the thickness of the master seal 48 is slightly greater than that of the regular seal 31 under natural conditions. The master seal 48 and the master bushing 47 come into sliding contact with each other on the boundary surfaces of the periphery of the stepped hole 36a of the master link 34 and the periphery of the bushing insertion hole 21 of the regular link 20. Therefore, the regular link 20 incorporated into the master bushing 47 can be smoothly detached from the master link 34 by sliding the regular link 20 in a radial direction of the master bushing 47 away from the master link 34 after extracting the regular pin 22 from the pin insertion hole 36 of the master link 34.

(Description of Structure of Connection Parts of Master Link and Regular Link Located at Other End of Master Link)

The slit aperture 45 of the master link 34 is adjusted to the specified size (T) according to the thickness of the spacer 46 by tightening the master bolt 43. In addition, since one end of the slit aperture 45 leads to the central through hole 44 and the other end of the slit aperture 45 leads to the pin insertion hole 36, the amount of displacement of the slit aperture by the tightening is evened out.

After adjusting the slit aperture 45 to the specified size (T), a proper clamping force is imparted to the regular pin 22 inserted in the pin insertion hole 36 of the master link 34 from the inner circumferential surface of the pin insertion hole 36 so that the regular pin 22 is securely retained by the master link 34.

After loosening and removing the master bolt 43, the slit aperture 45 of the master link 34 is restored to its initial size ($T_0$) that is slightly greater than the specified size (T) by the elastic restoration force of the master link 34. After the slit aperture 45 comes to have the initial size ($T_0$), the pin insertion hole 36 of the master link 34 has such a diameter that a small clearance is created between the pin insertion hole 36 and the regular pin 22 so that the regular pin 22 can be easily removed from and inserted into the pin insertion hole 36 of the master link 34.

(Description of Crawler Belt Removal Operation)

The removal operation for the crawler belt 16 is performed in the following way.

The master bolts 42 and 43 are loosened to be removed from the master link 34. Then, the pin insertion hole 36 of the master link 34 has such a diameter that a minute clearance is created between the pin insertion hole 36 and the regular pin 22. This enables easy removal of the regular pin 22 from the pin insertion hole 36 of the master link 34. Thereafter, the regular pin 22 is extracted from the pin insertion hole 36 of the master link 34, thereby disconnecting the master link 34 from the regular link 20 adjacent to the other end of the master link 34. Unlike the regular bushing 23, the master bushing 47 has only such length that its end surface abuts on the rear surface 34b of the regular link 20 and therefore the loop-shaped crawler belt 16 can be easily disconnected only by extraction of the regular pin 22. By linearly stretching the crawler belt 16 after the disconnection, the crawler belt 16 can be detached from the idler 11 and the sprocket 13 (both are shown in FIG. 1).

(Description of Crawler Belt Connection Operation)

The connection operation for the crawler belt 16 is performed in the following way.

The linearly stretched crawler belt 16 is wound around the idler 11 and the sprocket 13 (both are shown in FIG. 1). Then, the other end of the master link 34 is laid over one end of the regular link 20 such that the pin insertion hole 36 of the master link 34 is aligned with the hollow portion 47a of the master bushing 47 inserted into the bushing insertion hole 21 of the regular link 20 adjacent to the other end of the master link 34. Since the end surface of the master bushing 47 is flush with the rear surface 34b of the regular link 20, the other end of the master link 34 can be easily laid over the one end of the regular link. Then, the regular pin 22 is inserted into the master bushing 47 from the pin insertion hole 36 of the master link 34 so as to extend throughout the master bushing 47. Then, the master bolt 42 is screwed into the screw hole 39 of the master link 34 and tightened, while the master bolt 43 is screwed into the screw hole 40 of the master link 34 through the bolt insertion hole 46a of the spacer 46 and tightened. In this way, the slit aperture 45 is adjusted to the specified size (T) according to the thickness of the spacer 46, and a proper clamping force is imparted to the regular pin 22 inserted into the pin insertion hole 36 of the master link 34 from the inner circumferential surface of the pin insertion hole 36. This causes the regular pin 22 to be firmly retained by the master link 34 to enable connection of the crawler belt.

(Operation and Effects of First Embodiment)

In the crawler belt 16 of the first embodiment, the master link 34 has the slit aperture 45 leading only to the pin insertion hole 36 located at the other end of the master link 34. Therefore, the clamping force generated by the tightening of the master bolt 43 works on only the regular pin 22 inserted in the pin insertion hole 36 that leads to the slit aperture 45. Therefore, a proper clamping force can be applied to the regular pin 22 inserted in the pin insertion hole 36 by controlling the force of tightening the master bolt 43 so that the operation of connecting the crawler belt 16 can be facilitated. By releasing the tightening force for the master bolt 43, the regular pin 22 inserted in the pin insertion hole 36 can be easily extracted thereby facilitating the operation of disconnecting the crawler belt 16.

According to the crawler belt 16 of the first embodiment, connection and disconnection of the crawler belt 16 can be easily performed by the operation of the master bolt 43.

Since the spacer 46, which adjusts the width of the slit aperture 45 to the specified size (T) when tightening the master bolt 43, is inserted into the slit aperture 45, a proper clamping force can be easily and accurately applied to the regular pin 22 inserted into the pin insertion hole 36.

The master bolt 43 serves both as a fastening device for attaching the track shoe 18 to the master link 34 and as a fastening device for narrowing the slit aperture 45, which contributes to simplification of the system configuration.

Second Embodiment

Figure 4:
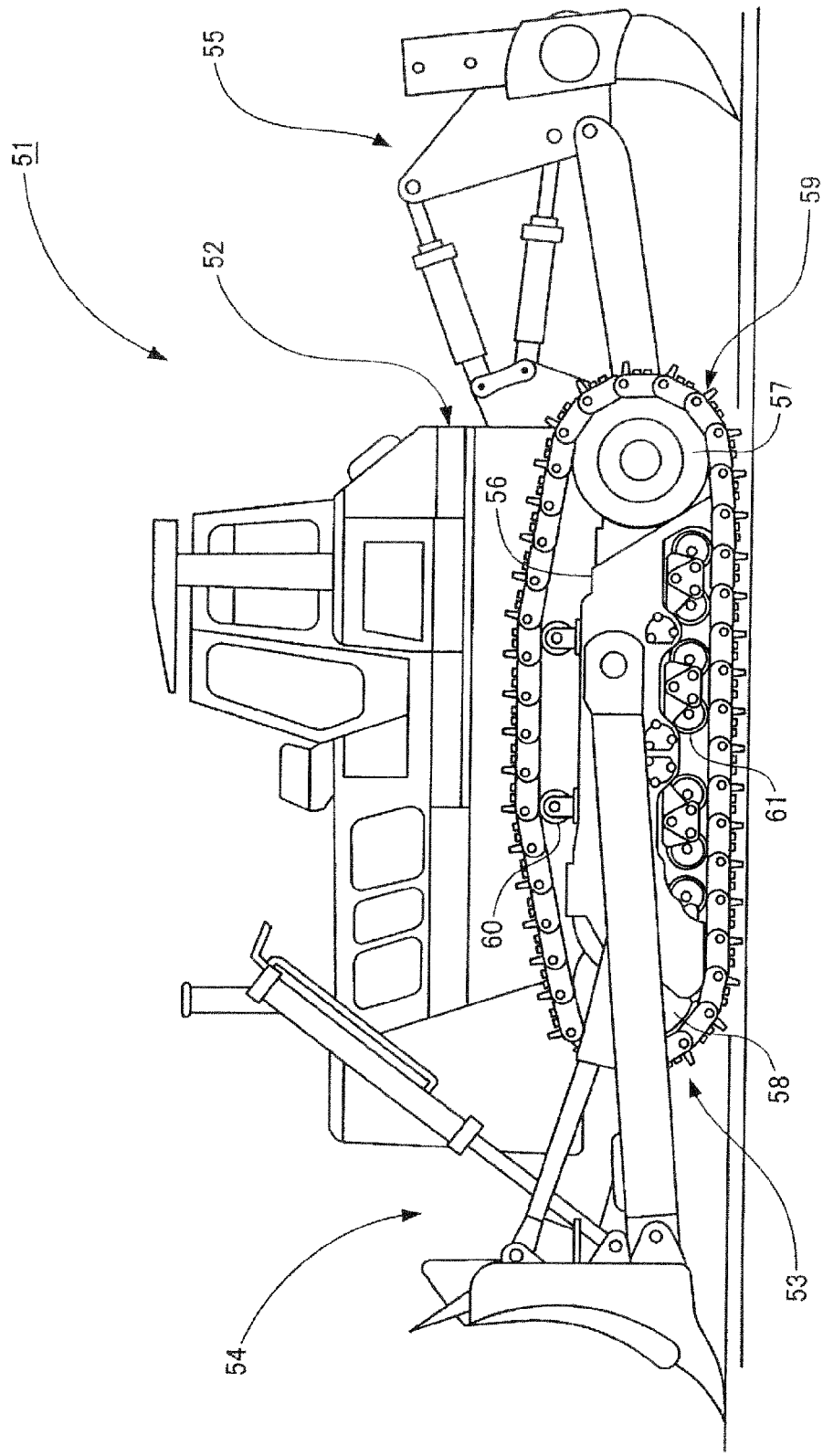
FIG. 4 is a side view of a bulldozer equipped with a crawler belt according to a second embodiment of the invention.

FIG. 4 shows a side view of a bulldozer equipped with a crawler belt according to a second embodiment of the invention.

(Outline of Bulldozer)

FIG. 4 shows a bulldozer 51 which has a vehicle body 52, crawler travel units (only left crawler travel unit is shown) 53 disposed on the right and left sides, respectively, of the vehicle body 52, a blade (front work implement) 54 located in front of the vehicle body 52, and a ripper (rear work implement) 55 located behind the vehicle body 52. The bulldozer 51 is configured to perform dozing and carrying by the blade 54 and crushing and digging by the ripper 55.

(Outline of Crawler Travel Unit of Bulldozer)

Each crawler travel unit 53 has a track frame 56 that constitutes its framework. The track frame 56 is disposed in front of a sprocket 57 so as to extend in a longitudinal direction, the sprocket 57 serving as a driving wheel and being supported by the rear part of the vehicle body 52. In front of the track frame 56, an idler 58 is rotatively mounted as an idler tumbler. A crawler belt 59, which serves as an endless track, encircles the idler 58 and the sprocket 57, forming an elliptical shape. Disposed on the upper surface of the track frame 56 are desired track carrier rollers 60. The track carrier rollers 60 support the crawler belt 59 from the underside thereof, while the crawler belt 59 moving in a direction from the sprocket 57 to the idler 58 or in a direction opposite thereto, so that hanging of the crawler belt 59 owing to its own weight and meandering of the crawler belt 59 are prevented. Disposed on the lower surface of the track frame 56 are desired track rollers 61. The track rollers 61 function to dispersedly transmit the weight of the vehicle body to the crawler belt 59 and prevent meandering of the crawler 59.

(Outline of Crawler Belt)

Figure 5:
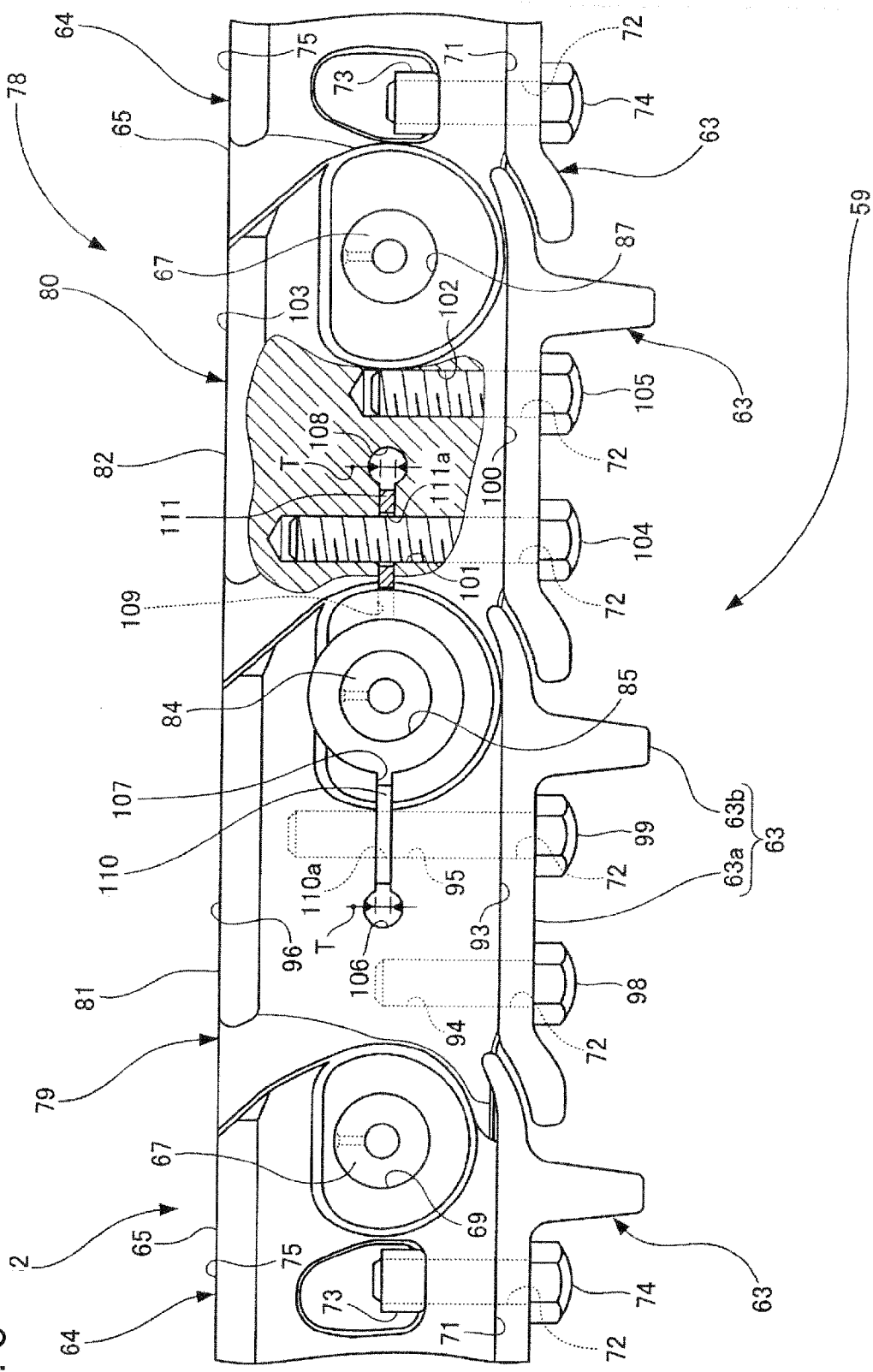
FIG. 5 is a side view of the crawler belt according to the second embodiment.
Figure 6:
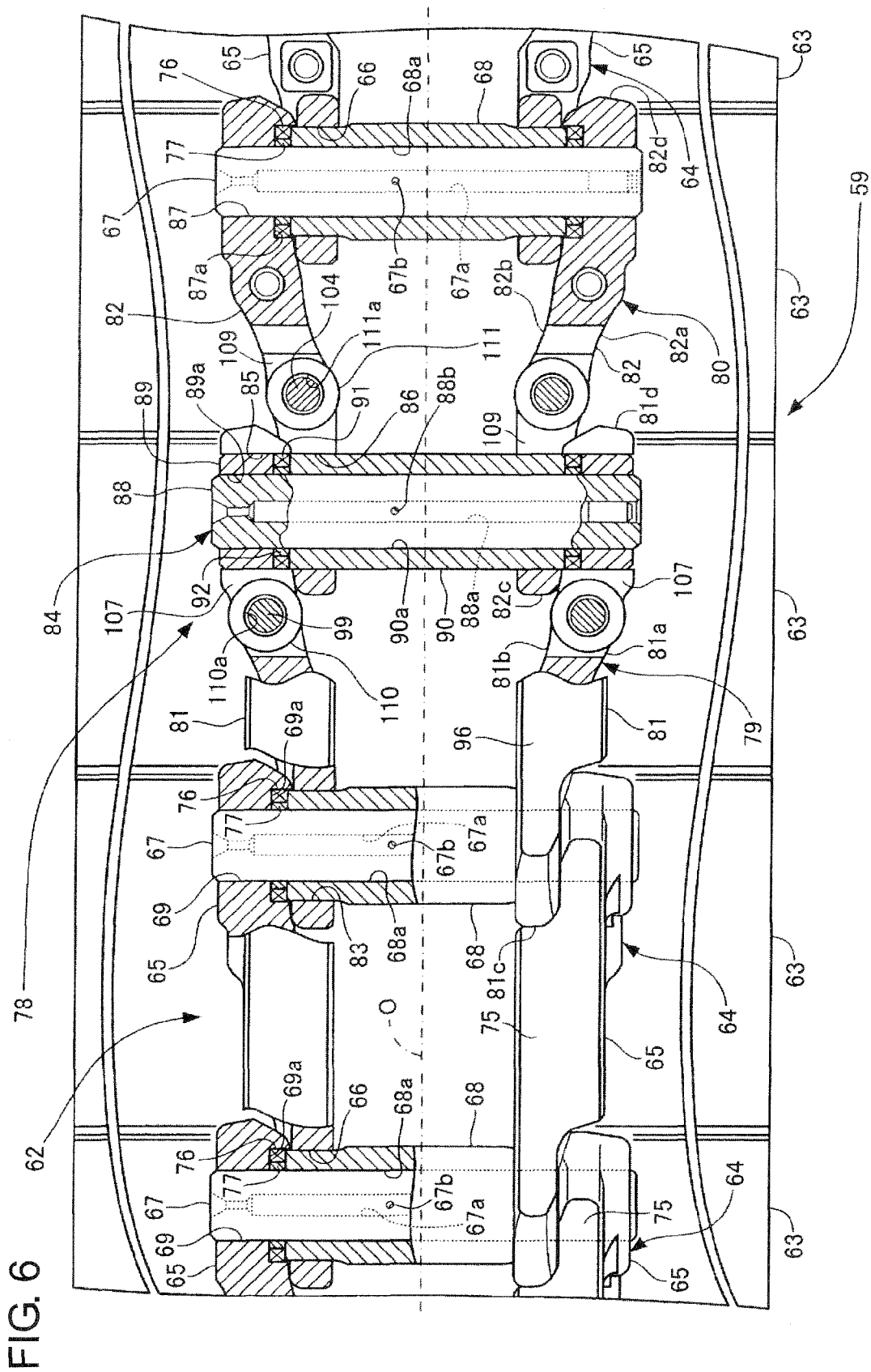
FIG. 6 is a plan view of the crawler belt according to the second embodiment.

As shown in FIGS. 5 and 6, the crawler belt 59 is composed of a track chain 62, track shoes 63 and master links 81, 82.

The track chain 62 is composed of a plurality of regular link assemblies 64 which are rotatably connected together at their ends.

Each track shoe 63 is constituted by a flat plate portion 63a and a protrusion portion 63b. The plate portion 63a is configured to come into contact with the ground surface, receiving the weight of the vehicle body. The protrusion portion 63b is called "grouser" and not only prevents slippage by digging into the earth but also serves as a reinforcement member.

(Description of Regular Link Assembly)

Each regular link assembly 64 is constituted by a pair of regular links 65 which are opposed to each other with the center line O of the track chain 62 interposed therebetween.

(Outline of Regular Link)

The regular links 65 are offset links having one end and the other end in which the other end is offset relative to the one end in a direction apart from the center line O of the track chain 62.

(Outline of Insertion Hole of Regular Link)

The regular link 65 has a bushing insertion hole 66 formed at one end thereof. Inserted into the bushing insertion hole 66 is a regular bushing 68 which has a regular pin 67 and a hollow portion 68a into which the regular pin 67 is slidably and fittingly inserted.

At the other end of the regular link 65, a pin insertion hole 69 is formed into which the regular pin 67 is inserted. Formed on the periphery of the pin insertion hole 69 is a stepped hole 69a that is opened toward the center line O of the track chain 62 and is concentric with the pin insertion hole 69.

(Description of Regular Pin)

The regular pin 67 has a lubricant reservoir 67a formed at the center thereof for storing a lubricant and a continuous hole 67b for allowing the lubricant reservoir 67a to be communicated with the outside. The lubricant oil stored in the lubricant reservoir 67a is guided to the outside via the continuous hole 67b to lubricate the outer circumferential surface of the regular pin 67 and the inner circumferential surface of the regular bushing 68.

(Description of Mounting Structure of Track Shoe Mounted to Regular Link)

The surface of the regular link 65 located on the ground contact side is a track shoe mounting surface 71. The track shoe 63 is secured to the track shoe mounting surface 71 by tightening two regular bolts 74 which are screwed into nuts 73 provided in the regular link 65 through bolt insertion holes 72 provided in the plate portion 63a. The track shoe 63 is attached to the regular link assembly 64 by four regular bolts 74 in total.

(Outline of Tread of Regular Link)

The surface of the regular link 65 on the ground non-contact side is a tread 75 that comes into rolling contact with the idler 58, the track carrier rollers 60 and the track rollers 61 respectively and has undergone surface hardening treatment such as thermal treatment because the rolling contact causes wear.

(Description of Clamping Allowance for Regular Pin and Regular Bushing Relative to Regular Link)

The clamping allowance for the regular pin 67 relative to the regular link 65 is set to a relatively small value so that the regular pin 67 cannot be easily inserted into and removed from the pin insertion hole 69.

The clamping allowance for the regular bushing 68 relative to the regular link 65 is also set to a relatively small value so that the regular bushing 68 cannot be easily inserted into and removed from the bushing insertion hole 66.

(Description of Regular Seal)

The stepped hole 69a of the regular link 65 is provided with a regular seal 76 incorporated therein for sealing off the gap between the regular pin 67 and the regular bushing 68. In this way, the lubricant supplied from the lubricant reservoir 67a of the regular pin 67 to the gap between the regular pin 67 and the regular bushing 68 through the continuous hole 67b can be prevented from leaking to the outside environment. In addition, a spacer 77 is inserted between the stepped hole 69a of the regular link 65 and the regular bushing 68. This spacer 77 is constituted by a ring-like member of specified thickness which can be mounted to the outer periphery of the regular pin 67 and functions to adjust the position of the regular bushing 68 relative to the stepped hole 69a of the regular link 65 thereby constantly keeping a space within the stepped hole 69a to accommodate the regular seal 76 therein.

Herein, the regular bushing 68 has such length that its end slightly bites into the stepped hole 69a of the regular link 65. Therefore, the regular seal 76 is incorporated in such a way that it is thoroughly pushed into the stepped hole 69a of the regular link 65 by the regular bushing 68.

(Outline of Coupling Device of Crawler Belt)

A coupling device 78 of the crawler belt according to this embodiment includes master link assemblies 79 and 80 disposed at a position where connection and disconnection of the track chain 62 is performed.

This master link assembly 79 is composed of a pair of master links 81 which are opposed to each other with the center line O of the track chain 62 interposed therebetween.

This master link assembly 80 is composed of a pair of master links 82 which are opposed to each other with the center line O of the track chain 62 interposed therebetween.

(Outline of Master Link)

Similarly to the regular link 65, the master links 81, 82 are plates having substantially six surfaces. Referring to FIGS. 5 and 6, their six surfaces are track shoe mounting surfaces 93, 100 located on the lower side; treads 96, 103 located on the upper side; front surfaces 81a, 82a; rear surfaces 81b, 82b; surfaces 81c, 82c located at one (left) end with respect to a longitudinal direction, and surfaces 81d, 82d located at the other (right) end with respect to the longitudinal direction. The track shoe mounting surface 93 (100) and the tread 96 (103) are parallel to each other, and the front surface 81a (82a) and the rear surface 81b (82b) are parallel to each other. The master links 81, 82 are offset links having one end and the other end in which the other end is offset relative to the one end in a direction away from the center line O of the track chain 62. The opposed master links 81 are formed as mirror images of each other and the opposed master links 82 are formed as mirror images of each other and therefore one pair of master links 81, 82 will be described in the following description.

(Description of Insertion Holes of Master Link)

The master link 81 has a bushing insertion hole 83 formed at one end thereof. Inserted into the bushing insertion hole 83 is a regular bushing 68 which has a regular pin 67 and a hollow portion 68a into which the regular pin 67 is slidably and fittingly inserted.

At the other end of the master link 81, a pin insertion hole 85 is formed for receiving the cartridge pin 84 inserted therein.

At the one end of the master link 82, a pin insertion hole 86 is formed for receiving the cartridge pin 84 inserted therein.

At the other end of the master link 82, a pin insertion hole 87 is formed for receiving the regular pin 67 inserted therein. Formed on the periphery of the pin insertion hole 87 is a stepped hole 87a that is opened toward the center line O of the track chain 62 and is concentric with the pin insertion hole 87.

(Description of Cartridge Pin)

The cartridge pin 84 is composed of a core pin 88, a sleeve 89, a bushing 90, a seal 91 and a spacer 92.

The core pin 88 constitutes the core of the cartridge pin 84. The core pin 88 has a lubricant reservoir 88a formed at the center thereof for storing a lubricant and a continuous hole 88b for allowing the lubricant reservoir 88a to be communicated with the outside. The lubricant stored in the lubricant reservoir 88a is guided to the outside through the continuous hole 88b to lubricate the outer circumferential surface of the core pin 88 and the inner circumferential surface of the bushing 90.

The sleeve 89 has a pin press fit hole 89a for receiving the core pin 88 forcibly inserted therein and is inserted into the pin insertion hole 85 located at the other end of the master link 81.

The bushing 90 has a hollow portion 90a into which the core pin 88 is slidably and fittingly inserted and is inserted into the pin insertion hole 86 located at the one end of the master link 82.

The seal 91 is interposed between the sleeve 89 and the bushing 90 to seal off the clearance between the core pin 88 and the bushing 90. In this way, the lubricant supplied from the lubricant reservoir 88a of the core pin 88 to the space between the core pin 88 and the bushing 90 through the continuous hole 88b can be prevented from leaking to the outside environment.

The spacer 92 is inserted between the sleeve 89 and the bushing 90 so as to be positioned on the inner circumferential side of the seal 91. This spacer 92 is constituted by a ring-like member of specified thickness which can be mounted to the outer periphery of the core pin 88 and functions to adjust the position of the bushing 90 relative to the sleeve 89 thereby keeping a space between the sleeve 89 and the bushing 90 to accommodate the seal 91 therein.

(Description of Mounting Structure of Track Shoes Mounted to Master Links)

The surface of the master link 81 located on the ground contact side is a track shoe mounting surface 93.

A screw hole 94 is formed in the vicinity of the bushing insertion hole 83 of the master link 81. A screw hole 95 is formed in the vicinity of the pin insertion hole 85 of the master link 81. These screw holes 94, 95 are both opened to the track shoe mounting surface 93 and extend in a direction toward the tread 96 formed in the ground non-contact side of the master link 81.

The track shoe 63 is secured to the track shoe mounting surface 93 by tightening master bolts 98 and 99 which are screwed into screw holes 94 and 95, respectively, provided in the master link 81 through the bolt insertion holes 72 provided in the plate portion 63a. The track shoe 63 is attached to the master link assembly 79 by four master bolts in total, that is, two master bolts 98 and two master bolts 99.

The surface of the master link 82 located on the ground contact side is the track shoe mounting surface 100.

A screw hole 101 is formed in the vicinity of the pin insertion hole 86 on the side of the one end of the master link 82. A screw hole 102 is formed in the vicinity of the pin insertion hole 87 on the side of the other end of the master link 82. These screw holes 101 and 102 are both opened toward the track shoe mounting surface 100 and extend toward the tread 103 formed on the ground non-contact side of the master link 82.

The track shoe 63 is secured to the track shoe mounting surface 100 by tightening master bolts 104 and 105 which are screwed into screw holes 101 and 102, respectively, provided in the master link 82 through the bolt insertion holes 72 provided in the plate portion 63a. The track shoe 63 is attached to the master link assembly 80 by four master bolts in total, that is, two master bolts 104 and two master bolts 105.

(Description of Tread of Master Link)

The treads 96, 103 of the master links 81, 82 come into rolling contact with the idler 58, the track carrier rollers 60 and the track rollers 61 (they are shown in FIG. 4) and have been subjected to surface hardening treatment such as thermal treatment because the rolling contact causes wear.

(Description of Slit Aperture of Master Link)

The center of the master link 81 is provided with a circular central through hole 106 through which the master link 81 passes in a thickness-wise direction thereof and which is located at a position intermediate between the screw hole 94 and the screw hole 95. The master link 81 is provided with a slit aperture 107 which leads to the pin insertion hole 85 located at the other end, passing transversely across the screw hole 95 from the central through hole 106. The slit aperture 107 is a clearance that is located at a position substantially intermediate between the track shoe mounting surface 93 and tread 96 of the master link 81 and passes through between the front surface 81a and rear surface 81b of the master link 81, being parallel to the track shoe mounting surface 93 and the tread 96.

The center of the master link 82 is provided with a circular central through hole 108 which is located at a position intermediate between the screw hole 101 and the screw hole 102, passing through the master link 82 in a thickness-wise direction thereof. The master link 82 is provided with a slit aperture 109 which leads to the pin insertion hole 86 located at the one end, passing transversely across the screw hole 101 from the central through hole 108. The slit aperture 109 is a clearance that is located at a position substantially intermediate between the track shoe mounting surface 100 and tread 103 of the master link 82 and passes through between the front surface 82a and rear surface 82b of the master link 82, being parallel to the track shoe mounting surface 100 and the tread 103.

(Description of Spacer Inserted in Slit Aperture)

Spacers 110 and 111 are inserted in the slit apertures 107 and 109. These Spacers 110 and 111 are constituted by annular flat plates having bolt insertion holes 110a, 111a through which the master bolts 99 and 104 can be inserted.

The thicknesses of the spacers 110 and 111 are so determined as to cause the widths of the slit apertures 107, 109 to have specified values (T, T) when fastening the master bolts 99, 104 screwed into the screw holes 95, 101 through the bolt insertion holes 110a, 111a after inserting the spacers 110, 111 into the slit apertures 107, 109 such that the bolt insertion holes 110a, 111a of the spacers 110, 111 are aligned with the screw holes 95, 101 of the master links 81, 82.

(Description of Structure of Connecting Parts of One Master link and Regular Link)

The structure of the connection parts of the master link 81 and the regular link 65 adjacent to one end of the master link 81 will be described.

At the side near the center line O of the track chain 62, the one end of the master link 81 overlaps the other end of the regular link 65.

The regular pin 67 is incorporated so as to pierce the hollow portion 68a of the regular bushing 68 inserted into the bushing insertion hole 83 of the master link 81 and into the pin insertion hole 69 of the regular link 65. As mentioned earlier, the clamping allowance for the regular pin 67 relative to the regular link 65 is set to a relatively small value so that the regular pin 67 cannot be easily inserted into and removed from the pin insertion hole 69. Similarly, the clamping allowance for the regular bushing 68 relative to the master link 81 is also set to a relatively small value so that the regular bushing 68 cannot be easily inserted into and removed from the bushing insertion hole 83.

The clearance between the regular bushing 68 inserted into the bushing insertion hole 83 of the master link 81 and the regular pin 67 inserted into the pin insertion hole 69 of the regular link 65 is sealed off by the regular seal 76 incorporated into the stepped hole 69a of the regular link 65. Therefore, the lubricant, which has been supplied to the space between the regular pin 67 and the regular bushing 68 through the continuous hole 67b from the lubricant reservoir 67a of the regular pin 67, is prevented from leaking to the outside environment.

(Description of Structure of Connecting Parts of Master Links)

The structure of the connecting parts of the master links 81 and 82 will be described.

At the side near the center line O of the track chain 62, one end of the master link 82 overlaps the other end of the master link 81.

The cartridge pin 84 is incorporated so as to pass through the pin insertion hole 85 located at the other end of the master link 81 and the pin insertion hole 86 located at the one end of the master link 82.

The slit apertures 107, 109 of the master links 81, 82 are adjusted to the specified sizes (T, T) according to the thicknesses of the spacers 110, 111 by tightening the master bolts 99, 104. After the slit apertures 107, 109 are adjusted to the specified sizes (T, T), a proper clamping force is applied from the inner circumferential surfaces of the pin insertion holes 85, 86 to the cartridge pin 84 inserted into the pin insertion holes 85, 86 of the master links 81, 82 so that the cartridge pin 84 is firmly retained by the master links 81, 82.

After loosening and removing the master bolts 99, 104, the slit apertures 107, 109 of the master links 81, 82 are restored to their initial sizes ($T_0$, $T_0$) that are slightly greater than the specified sizes (T, T) by the elastic restoration force of the master links 81, 82. After the slit apertures 107, 109 come to have the initial sizes ($T_0$, $T_0$), the pin insertion holes 85, 86 of the master links 81, 82 have such diameters that a small clearance is created between the pin insertion holes 85, 86 and the cartridge pin 84 so that the cartridge pin 84 can be easily removed from and inserted into the pin insertion holes 85, 86 of the master links 81, 82.

(Description of Structure of Connecting Parts of the Other Master Link and Regular Link)

The structure of the connection parts of the master link 82 and the regular link 65 adjacent to the other end of the master link 82 will be described.

At the side near the center line O of the track chain 62, one end of the regular link 65 overlaps the other end of the master link 82.

The regular bushing 68 is inserted into the bushing insertion hole 66 of the regular link 65.

The regular pin 67 is incorporated so as to pass through the hollow portion 68a of the regular bushing 68 and through the pin insertion hole 87 located at the other end of the master link 82. The clamping allowance for the regular pin 67 relative to the master link 82 is set to a relatively small value so that the regular pin 67 cannot be easily inserted into and removed from the pin insertion hole 87.

The clearance between the regular pin 67 inserted into the pin insertion hole 87 of the master link 82 and the regular bushing 68 is sealed off by the regular seal 76 incorporated into the stepped hole 87a of the master link 82. Therefore, the lubricant, which has been supplied to the space between the regular pin 67 and the regular bushing 68 through the continuous hole 67b from the lubricant reservoir 67a of the regular pin 67, is prevented from leaking to the outside environment.

(Description of Crawler Belt Removal Operation)

The removal operation for the crawler belt 59 is performed in the following way.

The master links 81, 82 are removed by loosening the master bolts 99, 104. Then, the pin insertion holes 85, 86 of the master links 81, 82 have such diameters that a minute clearance is created between the pin insertion holes 85, 86 and the cartridge pin 84. This enables it to easily extract the cartridge pin 84 from the pin insertion holes 85, 86 of the master links 81, 82. Then, the cartridge pin 84 is extracted from the pin insertion holes 85, 86 of the master links 81, 82, thereby disconnecting the master links 81 and 82 from each other. In this way, easy disconnection of the crawler belt 59 can be performed. By linearly stretching the crawler belt 59 after the disconnection, the crawler belt 59 can be detached from the idler 58 and the sprocket 57 (both are shown in FIG. 4).

(Description of Crawler Belt Connection Operation)

The connection operation for the crawler belt 59 is performed in the following way.

The linearly stretched crawler belt 59 is wound around the idler 58 and the sprocket 57. Subsequently, the other end of the master link 81 is laid over the one end of the master link 82 such that the pin insertion hole 85 of the master link 81 is aligned with the pin insertion hole 86 of the master link 82. Then, the cartridge pin 84 is inserted throughout the pin insertion hole 86 of the master link 82 from the pin insertion hole 85 of the master link 81. The spacers 110, 111 are inserted into the slit apertures 107, 109 with the bolt insertion holes 110a, 111a of the spacers 110, 111 being aligned with the screw holes 95, 101 of the master links 81, 82. The master bolts 99, 104 are screwed into the screw holes 95, 101 of the master links 81, 82 through the bolt insertion holes 110a, 111a of the spacers 110, 111, and then, the master bolts 99, 104 are tightened. In this way, the slit apertures 107, 109 are adjusted to the specified size (T, T) according to the thicknesses of the spacers 110, 111 and a proper clamping force is applied from the inner circumferential surfaces of the pin insertion holes 85, 86 to the cartridge pin 84 inserted into the pin insertion holes 85, 86 of the master links 81, 82. This enables it to firmly retain the cartridge pin 84 by the master links 81, 82 thereby to establish connection of the crawler belt 59.

(Operational Effects of Second Embodiment)

In the crawler belt 59 of the second embodiment, the master link 81 is provided with the slit aperture 107 which leads only to the pin insertion hole 85 formed at the other end of the master link 81, whereas the master link 82 is provided with the slit aperture 109 which leads only to the pin insertion hole 86 formed at the one end of the master link 82. Therefore, the clamping force generated by the tightening of the master bolts 99, 104 works on the cartridge pin 84 alone. Since a proper clamping force can be applied to the cartridge pin 84 by controlling the force of tightening the master bolts 99, 104, the operation for connection of the crawler belt 59 can be easily performed. Since the cartridge pin 84 can be easily removed by releasing the force of tightening the master bolts 99, 104, the operations for disconnection of the crawler belt 59 can be easily performed.

According to the crawler belt 59 of the second embodiment, connection and disconnection of the crawler belt 59 can both be easily performed through operation of the master bolts 99, 104.

Since the spacers 110, 111 for adjusting the widths of the slit apertures 107, 109 to the specified sizes (T, T) at the time of tightening the master bolts 99, 104 are inserted into the slit apertures 107, 109, a proper clamping force can be more easily and accurately applied to the cartridge pin 84.

The cartridge pin 84, which has the functions of a coupling pin, a bearing and a sealing device, is used as a means for connecting the master link 81 and the master link 82 together. This enables it to prevent leaking of the lubricant by the seal 91, which lubricant has been supplied to the space between the core pin 88 and the bushing 90, so that the core pin 88 and the bushing 90 can be kept in a stable sliding fit condition for a long period of time. The insertion and removal of the cartridge pin 84 is equivalent to the collective insertion and removal of a coupling pin, a bearing and a sealing device, which contributes to an increase in the efficiency of the operation for connection and disconnection of the crawler belt 59. This makes it possible not only to provide a crawler belt which can be kept in a stable connection condition over a prolonged period even if it is used under severe propelled conditions and but also to increase the efficiency of the operations for connection and disconnection of the crawler belt 59.

In addition, the master bolts 99, 104 serve both as fastening devices for mounting the track shoes 63 to the master links 81, 82 and as fastening devices for narrowing the slit apertures 107, 109, which contributes to simplification of the system configuration.

Although the crawler belt and the master link for use in the crawler belt of the invention have been described according to the plurality of embodiments, the invention is not necessarily limited to the particular configurations discussed in the embodiments shown herein. Various changes and modifications can be made to the embodiments without departing from the spirit and scope of the invention through proper combinations of the configurations of these embodiments.

For example, the master link of the first embodiment, to which one surface of the spacer is securely attached using an adhesive, may be modified such that the spacer inserted in the slit aperture is secured only by screwing the master bolts.

The regular links and master links of the second embodiment may be modified such that they do not have offset shapes but are formed as inner links and outer links.

INDUSTRIAL APPLICABILITY

The crawler belt and the master link for use in the crawler belt according to the invention enable easy connection and disconnection of the crawler belt. Therefore, the master link can be well suited for use as a coupling means for the crawler belts mounted in a work vehicle such as hydraulic excavators and bulldozers.

REFERENCE NUMERALS

1: hydraulic excavator
16: crawler belt (first embodiment)
17: track chain
18: track shoe
20: regular link
22: regular pins (first coupling pin, second coupling pin)
27: screw hole
32: coupling device for crawler belt
34: master link
34a: front surface (first surface)
34b: rear surface (second surface)
35: bush insertion hole (first insertion hole)
36: pin insertion hole (second insertion hole)
38: track shoe mounting surface
39: screw hole (first screw hole)
40: screw hole (second screw hole)
41: tread
42: master bolt (first bolt)
43: master bolt (second bolt)
44: central through hole
45: slit aperture
46: spacer 51: bulldozer
59: crawler belt (second embodiment)
62: track chain
63: track shoe
64: cartridge pin (second coupling pin)
65: regular link
67: regular pins (first coupling pin, third coupling pin)
78: coupling device for crawler belt
81: master link (first master link)
82: master link (second master link)
84: cartridge pin
88: core pin
89: sleeve
90: bushing
91: seal
93: track shoe mounting surface
95: screw hole
96: tread
99: master bolt (first fastening device)
100: track shoe mounting surface
102: screw hole
103: tread
104: master bolt (second fastening device)
106: central through hole
107: slit aperture (first slit aperture)
108: central through hole
109: slit aperture (second slit aperture)
110: spacer (first spacer)
111: spacer (second spacer)

The invention claimed is:

1. A crawler belt comprising a track chain in which a plurality of regular links are pivotally connected at their ends, a master link for connecting ends of said track chain together to form the crawler belt into a loop, and track shoes respectively attached to said regular links and said master link;

wherein each regular link having one end and another end is configured such that the other end is offset relative to the one end in a direction apart from a center line of said track chain;

wherein said master link having one end and another end is configured such that the other end is offset relative to the one end in a direction apart from the center line of said track chain and has a first insertion hole located at said one end, a second insertion hole located at said other end and a central through hole located at a center between said one end and said other end; and wherein said crawler belt further comprises:

a first coupling pin which is inserted into an insertion hole formed at the other end of a first one of said plurality of regular links, said first one regular link being adjacent to the one end of said master link and wherein the first coupling pin is further inserted into said first insertion hole;

a second coupling pin which is inserted into an insertion hole formed at the one end of a second one of said plurality of regular links, said second one regular link being adjacent to the other end of said master link and wherein the second coupling in is further inserted into said second insertion hole;

a slit aperture formed in said master link, one end of said slit aperture leading to said central through hole and another end of the slit aperture leading to said second insertion hole;

a spacer inserted into said slit aperture to adjust a width of said slit aperture to a specified value;

a first bolt screwed into a first screw hole which is formed in said master link at a position intermediate between said first insertion hole and said central through hole; and a second bolt screwed into a second screw hole which is formed in said master link at a position intermediate between said central through hole and said second insertion hole so as to pass transversely across said slit aperture.

2. The crawler belt according to claim 1, wherein said first and second bolts are screwed into said first and second screw holes, respectively, through bolt insertion holes, each of which is provided in an associated one of said track shoes.

3. A master link for connecting ends of a track chain together to form a crawler belt into a loop, said master link comprising:

an integral plate having a track shoe mounting surface to which a track shoe is mounted, a tread opposed to and parallel to said track shoe mounting surface, a first surface connecting said track shoe mounting surface and a longitudinal side of said tread together, and a second surface opposed to said first surface;

a first insertion hole which is located at one end of the master link, and which passes through from said first surface to said second surface;

a second insertion hole which is located at another end of the master link, and which passes through from said first surface to said second surface;

a central through hole which is located at a position intermediate between said one end and said other end of the master link, and which passes through from said first surface to said second surface;

a slit aperture formed in parallel with said track shoe mounting surface, wherein one end of the slit aperture leads to said central through hole whereas another end of the slit aperture leads to said second insertion hole;

a spacer inserted into said slit aperture to adjust a width of the slit aperture to a specified value;

a first screw hole which is located at a position intermediate between said first insertion hole and said central through hole, which is opened to said track shoe mounting surface and which extends in a direction toward said tread; and a second screw hole which is located at a position intermediate between said second insertion hole and said central through hole so as to pass transversely across said slit aperture, which is opened to said track shoe mounting surface and which extends in a direction toward said tread.

* * * * *